Figure 1:
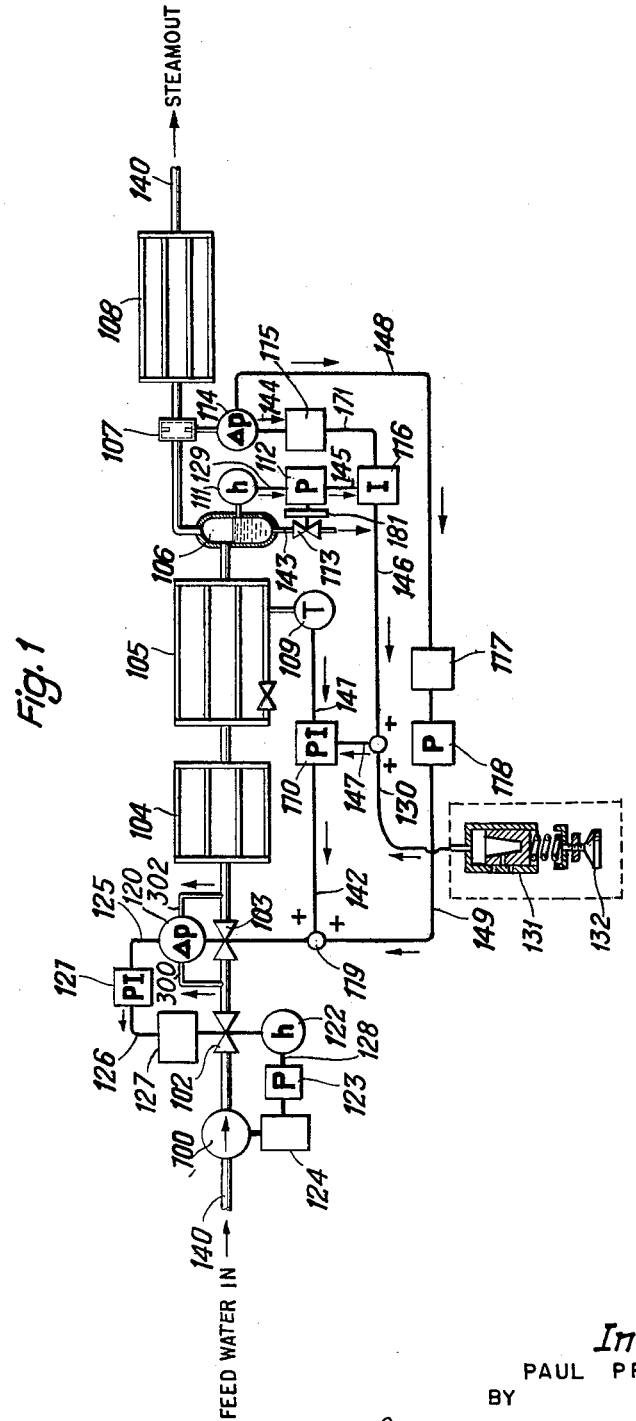

June 4, 1963 P. PROFOS 3,092,086
FEED-WATER CONTROL FOR FORCED-CIRCULATION BOILERS
Filed July 15, 1959 3 Sheets-Sheet 1

Inventor:
PAUL PROFOS
BY
ATTORNEYS

June 4, 1963   P. PROFOS   3,092,086
FEED-WATER CONTROL FOR FORCED-CIRCULATION BOILERS
Filed July 15, 1959   3 Sheets-Sheet 2

INVENTOR.
PAUL PROFOS
BY
Pennie Edmonds Morton Barrows & Taylor

ATTORNEYS

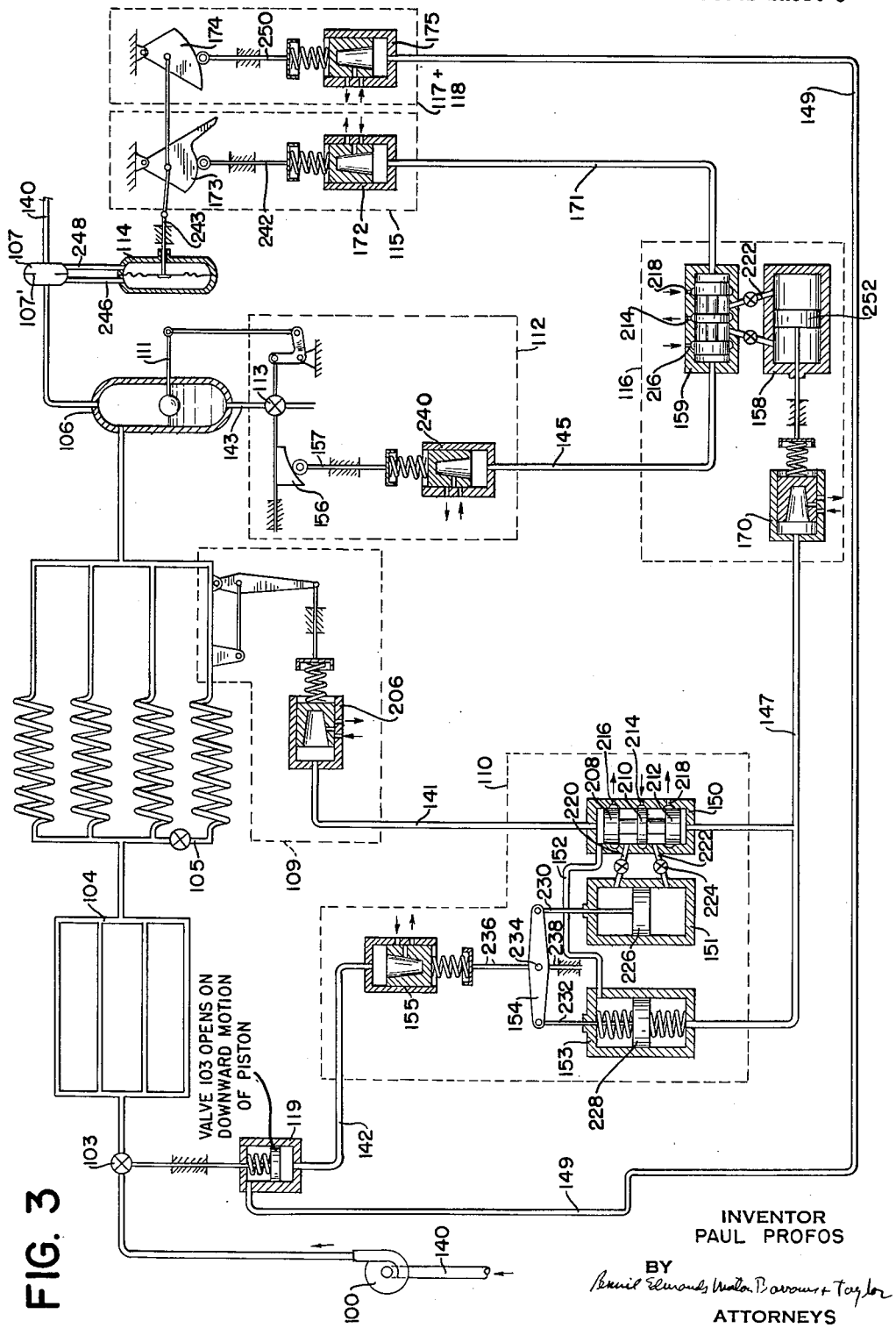

United States Patent Office 3,092,086
Patented June 4, 1963

3,092,086
FEED-WATER CONTROL FOR FORCED-
CIRCULATION BOILERS
Paul Profos, Winterthur, Switzerland, assignor to Sulzer
Freres, Societe Anonyme, Winterthur, Switzerland, a
Swiss company
Filed July 15, 1959, Ser. No. 827,387
Claims priority, application Switzerland July 18, 1958
3 Claims. (Cl. 122—451.1)

The present invention relates to control of the rate of supply of feed-water to a forced-circulation boiler, in which the rate of feed-water supply is subjected to control by at least one signal representative of the temperature of the working substance in the evaporation zone of the boiler. For simplicity, but without intended limitation on the scope of the invention, which is not limited to water as a working substance, the working substance will hereinafter be referred to as water.

According to the invention, the signal representative of actual temperature of the working substance is taken at the end of one of a plurality of parallel steaming tube channels, the channel selected for this purpose being arranged to be heated somewhat more intensely than the others, and heated in fact to some degree of superheat. In this way the temperature signal serves as a measure of the wetness of the steam in the other channels. Since with variations in load on the boiler the pressure varies in the evaporator and elsewhere in advance of the water separator, the temperature at the hot end of this slightly superheated channel must assume different values for different load conditions, if a constant average degree of wetness is to be achieved for the steam entering the separator. It is indeed customary to vary as a function of load the desired or reference value to which this actual temperature signal is compared.

Construction of a control system suitable to these ends requires exact design computations of the pressures obtaining in advance of the separator for various load levels. There are however various other factors which appear in the practical operation of a system and which affect significantly the temperature measurement, such as for example changes in the cleanliness of the heat-transfer surfaces, which cannot be taken into account in these computations.

In contrast, the invention takes for the reference signal a signal that is responsive to deviations of steam wetness from a desired value and compares the actual temperature signal therewith. Such a reference signal can be derived for example from the ratio of extracted water to feed-water input. The method of the invention possesses substantial advantages. Among these is the fact that no means are necessary for adjustment of the reference signal as a function of load. Alternatively, if such means are to be retained, larger tolerances can be accepted on the degree of exactitude with which design computations above referred to must be made. Further, in the case of the accumulation of soot or scale on the heat-transfer surfaces or in the event of shift in the location of the fire with respect thereto, the reference signal will be altered accordingly, so that a more dependable and uniform operation of the boiler system can be achieved than heretofore. If, moreover, means for variation of the reference signal as a function of load are retained (in which case substantially lower demands are required on the exactitude of the reference signal cam), errors in the shifting of the reference signal (due to such reduced exactitude) are compensated out by origin of the reference signal in deviations of the steam wetness from a desired value.

The invention relates further to apparatus for carrying out the method of the invention in a steam generator including means for varying the feed-water rate of flow, a water separator following the evaporator, and a control circuit which includes a temperature measuring device, a controller operated thereby, and a servomechanism responsive to this controller and operative on the means for varying the rate of feed-water flow. The apparatus of the invention is characterized by the fact that a feed-water flow rate indicator and an indicator of the rate of water separation deliver signals to an integrating device whose output signal is applied as the reference signal input of the feed-water rate of flow controller.

Figure 2:
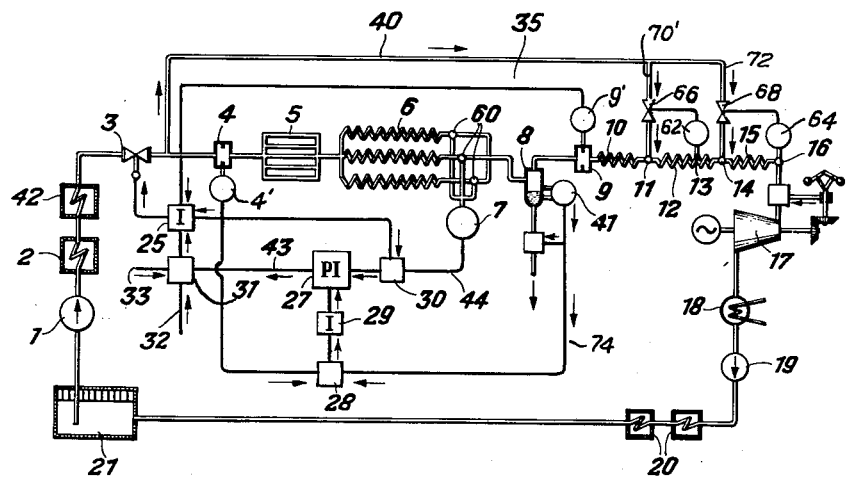

The invention will now be described in further detail with reference to the accompanying drawings, in which FIGS. 1 and 2 are schematic diagrams of steam generating plants of the forced circulation type in accordance with the invention, and FIG. 3 is a diagram illustrating in further detail certain components of the system of FIG. 1.

In FIG. 1 a feed-water pump is shown at 100, disposed in a line 140 which leads to a pressure difference regulating valve 102, a feed-water control valve 103, an economizer 104, an evaporator 105, a water separator 106, a rate of steam flow measuring perforated diaphragm chamber 107, and a superheater 108. Beyond the superheater 108 the line 140 carries the steam to the right in FIG. 1 to a steam consuming machine such as a turbine, which is coupled to a suitable load such as an alternator. At the high temperature end of the evaporator 105 there is arranged a temperature measuring device 109 which may take the form of a multiple thermostat. A signal channel 141 leads from the temperature measuring device 109 to control device 110 having a proportional-integral mode of action. This device will be further described with reference to FIG. 3. Control device 110 in turn is connected by a signal channel 142 with a servomotor 119 coupled to the flow control valve 103 to control the opening thereof.

Hydraulic lines 300 and 302 connect into line 140 on opposite sides of valve 103 and lead to a pressure difference measuring device 120. An output signal channel 125 leads from the device 120 to a second control device 121, also having a proportional-integral mode of action.

Control device 121 is connected via a signal channel 126 with the servomechanism 127 of the pressure difference control valve 102. Valve 102 is so adjusted by control device 121 that the pressure drop at valve 103 remains constant. The vane or other movable element of valve 102 is coupled to a device 122 which generates a signal representative of the position of valve 102, and a signal channel 128 leads from device 122 to a control device 123 having a proportional mode of operation. Device 123 is coupled to and controls motor 124 of the feed pump 100. The arrangement of devices 122 and 123 is such that with falling rates of feed-water input, there is diminished not only the cross sectional opening of the pressure difference valve 102 (by operation of devices 121 and 127) but also (by operation of devices 123 and 124) the speed of the pump 100, in order to hold at a low level the throttling losses in valve 102.

A water level measuring device 111, which may incorporate a float, is coupled to the water separator 106 to measure the water level therein, and a signal channel 129 leads from this device 111 to a control device 112 having a proportional mode of operation. Device 112 connects via a servomechanism 181 with the valve 113. Valve 113 is disposed in a waste line 143 leading from the separator 106.

The diaphragm chamber 107 and bellows chamber 114, whose construction is shown in FIG. 3, generate signals, which may be in the form of displacements of a rod coupled to the bellows, and which are representative of the rate of steam flow through chamber 107. These signals are delivered via a signal channel 144 to a function transformer 115. The function transformer is so arranged as to extract the square root of the pressure difference signal generated in device 114. The root so extracted corresponds to the rate of steam flow. The signal is further transformed by device 115 according to the desired relationship of steam wetness to load and is delivered to an integrating device 116 where it serves as a reference value to be compared with the signal representing the quantity of water extracted through valve 113. This quantity of water can be read off directly from an indicator forming part of the control device 112 and is communicated from that device via signal channel 145 to integrating device 116. The ratio of extracted water to the rate of steam flow can be made any desired function of load, and in particular it need not be held constant over the whole range of loads. A signal channel 146 leads from the integrating device 116 to the reference level input 147 of the control device 110 in the temperature-responsive control circuit operating on valve 103. A signal channel 148 leads from the pressure difference measuring device 114 via a square root extracting device 117 to a proportionally operating controller 118, from which a signal channel 149 leads to the servomechanism 119 of the feed-water control valve 103.

The operation of the system of FIG. 1 is as follows:

The working substance, in the form of water or other liquid, is forced by the pump 100 through the pressure difference control valve 102, the feed-water supply control valve 103, the economizer 104 and the evaporator 105, in which it is heated and largely vaporized. The mixture of steam and water so developed passes into the separator 106. The steam there separated from the water passes through the rate of steam flow measuring chamber 107 to the superheater 108 and from thence to the steam consuming apparatus of the installation. For a given load, the system is controlled by device 110 and the feed-water control valve 103 controlled thereby, in response to the temperature measurements made at the temperature measuring device 109. The reference signal passed into control device 110 from the signal channel 147 is comprised of the reference signal in channel 146, this latter signal being a function of the ratio of the water extracted in the separator 106 to the rate of flow of steam passing into the superheater 108. For constant load this reference signal is substantially constant.

As the load on the system increases, the pressure in advance of the separator 106 increases, so that the saturation steam temperature in evaporator 105 will rise also. Consequently, the amount of unvaporized water passing out of the evaporator will increase. This increase will result, by operation of the float mechanism 111, in an increased quantity of water drawn off through conduit 143, and the ratio of this extracted water to the steam increases. In view of this altered relation of extracted water to steam, the reference signal derived in the integrating apparatus 116 and passed via channel 146 to the input line 147 of control device 110 will rise until the rate of extraction corresponds to the new load. This signal thus serves as a reference against which the steam temperature signal from device 109 is compared. Since in view of the integrating nature of the device 116 the adjustment of the reference signal in channel 147 is effected gradually and cannot follow sudden changes in load, an advance signal is derived at the pressure difference measuring device 114 and passed via channel 148 through the proportional control device 118 and the channel 149 where it modifies the output signal of control device 110 in channel 142 for control of the valve 103.

In an alternative embodiment of the invention there is supplied to the control apparatus 110 not only a varying reference signal representative of derivations of steam wetness from a desired value but also a varying reference signal representative of variations in load, this latter signal being applied at the channel 130 where it operates as an advance similar to the advance signal already described. The signal representative of load variations may be generated in conventional apparatus. One form of apparatus which may be employed is a manually operable hydraulic signal generator 131, the value of whose output hydraulic pressure is controllable at a hand wheel 132.

The actual temperature signal should be developed at a point in the system at which the temperature is a measure of the heat absorbed per unit mass of water. Consequently the temperature measuring device need not be disposed at the hot end of the evaporator. Instead it may be disposed on an adjacent heating surface or even in a superheater disposed in the same gas temperature zone of the furnace as the evaporator and therefore responsive in the same manner as the evaporator to variations in firing.

FIG. 2 shows schematically another embodiment of the invention in which the reference signal is developed from a measure of the feed-water input and from a measure of the rate of water extraction, this reference signal being then applied to the temperature control circuit.

In FIG. 2 there is shown a steam power plant of the forced circulation boiler type according to the invention. In this plant a feed-water pump 1, driven by a motor not shown forces feed-water from a starting vessel or reservoir 21 successively through high-pressure pre-heaters 2 and 42, a feed-water valve 3, a feed-water rate of flow measuring device 4, an economizer 5 and an evaporator 6 into a water separator 8.

From separator 8 the steam flows on through a steam rate of flow measuring device 9, a first superheater 10, a second superheater 12 and a final superheater 15 to a turbine 17 and from there into a condenser 18. The condensate is fed back to the starting vessel 21 through condensate pre-heaters 20 by a condensate pump 19. The device 4 with its associated bellows chamber 4′, and similarly the device 9 with its associated bellows chamber 9′, may be similar to chambers 107 and 114 respectively in FIG. 3, except that elements 4 and 4′ are proportioned to develop a signal representative of rate of flow of water in liquid form whereas elements 9 and 9′, like the elements 107 and 114 of FIG. 3, are proportioned to develop a signal representative of the rate of flow of steam. Cooling water injectors connect at 11 and 14 into the steam flow path of the system between superheaters 10 and 12 and between superheaters 12 and 15 respectively, and the amount of water injected thereby is controlled in accordance with the steam temperature as measured at points 13 and 16 by temperature measuring devices 62 and 64, which include servomechanisms for adjustment of valves 66 and 68 in branch lines 70′ and 72 leading from water line 40 to the injectors 11 and 14.

The function of the control apparatus of the invention shown in FIG. 2 is so to influence the flow of feed water that the amount of water separated out at the separator 8 will be a predetermined function of the load on the steam generating plant. The amount of water separated out is not, however, directly suitable for use as a regulating signal, because experience has shown that it is subject to wide fluctuations. On the other hand, a signal derived from the amount of water separated out, if smoothed by integration, can be used for feed-water control.

To this end, a signal derived from a device 41 for measuring the water level in separator 8, which signal is representative of the rate at which water is separated out from the steam line, is transmitted via a signal channel 74 to a comparison element 28. There it is compared with a reference signal representative of the desired rate of water separation, which is derived in elements 4 and 4' from the actual flow of feed-water instantaneously permitted by valve 3. The difference signal resulting from this comparison passes to an integrating device 29 whose output signal is applied to the regulator 27 of a temperature-responsive control circuit for adjustment of valve 3. This temperature-responsive control circuit includes temperature measuring elements 60 at the hot ends of the parallel channels 6, 6' and 6" of the evaporator, and a temperature signal generator 7 responsive to elements 60.

The steam power plant control system of the invention illustrated in FIG. 2 includes in addition a control circuit directly operative on the rate of feed-water input. This circuit includes the feed-water flow rate measuring apparatus 4 and 4', the integrating control device 25 responsive thereto and the servo-controlled valve 3 responsive to output signals from device 25. According to a further feature of the invention this last-named control circuit is combined with the temperature-responsive control circuit in that the control device 27, having a proportional and integral mode of operation, delivers its output signals through a channel 43 to the control device 25 of the control circuit operating directly on rate of feed-water input. In the embodiment illustrated this delivery is effected through a summing device 31 presently to be explained, which permits the input of additional signals by hand.

The system of FIG. 2 as thus far described may be further supplemented by the superposition of a signal representative of rate of steam flow derived in elements 9 and 9', this signal being passed through a channel 35 to the control device 25. Such a rate of steam flow signal responds with a shorter time constant than the slowly varying signal representative of steam temperature developed in device 7 and makes the system more quickly responsive to load changes. The control system of the invention accordingly may include a plurality of control circuits of which the first, operative on variations in the actual rate of feed-water flow, responds rapidly to departures of the system from its desired operating conditions, whereas the control circuit intermeshed therewith, which is responsive to steam temperature, is slower in operation. The further control circuit illustrated in FIG. 2 superposed on the temperature control circuit and operative on the relation of feed-water input to water extraction rate responds even more slowly to variations in operating conditions or departures therefrom.

For correction of the dynamic behavior of the temperature-responsive control circuit there is included in signal channel 44 between the temperature signal generating device 7 and the integrating device 27 a correction device 30 which supplies to control device 27 a correction signal derived from the rate of feed-water flow as measured in elements 4 and 4' and which serves as a precorrection signal. Such precorrection is desirable since with increasing load on the evaporator the pressure and hence the vaporization temperature or boiling point therein rises. This makes it advantageous to adjust the reference steam temperature to the instantaneous load by precorrection, and this is achieved by superposing on the actual temperature-representative signal in channel 44 a correction signal representative of instantaneous load derived in elements 4 and 4'.

The load-dependent shift in temperature as such is compensated by the signal delivered from comparison device 28 derived in the control circuit which operates on a comparison of feed-water supply rate with water extraction rate. Since however this compensation can, according to the dynamic behavior of the individual control circuits, be undesirably slow in operation, the faster precorrection by means of device 30 may be advantageous.

In the embodiment of FIG. 2 the output signal from the device 27 having a proportional and integral mode of operation is passed via signal channel 43 through a supplementary device 31 which makes it possible to adjust the rate of feed-water supply supplementarily by hand, by means of a signal applied to device 31 at an input channel 32. It is also possible to supply at an input channel 33 a threshold or minimum feed-water rate signal 33 to establish a minimum opening for the valve 3.

Device 31 may also establish other limits, for example to prevent operation of the system beyond maximum pressure or temperature limits at the output end of the evaporator.

The exemplary control circuit illustrated in FIG. 2 can be varied in numerous ways within the scope of the invention. For example the quantity of water to be injected at injectors 11 and 14 for control of steam temperature can be derived from the feed-water line at any point between the pump 1 and the rate of feed-water flow measuring device 4. Moreover, the speed of operation of the pump can be made dependent on the setting of valve 3.

FIG. 3 shows schematically in further detail certain elements of the system of FIG. 1. In FIG. 3 reference character 109 identifies generally a temperature measuring device coupled to the evaporator 105 at the high temperature end thereof. This device, with its hydraulic signal generating cylinder 206, is described in detail in my copending application Serial No. 798,464 filed March 10, 1959, where it is illustrated in FIG. 2 of that application. The device 109 generates in hydraulic line 141, by means of its hydraulic cylinder 206, temperature-representative signals which operate on the uppermost piston 208 of three coupled pistons 208, 210 and 212 in a servo-control cylinder 150. Hydraulic fluid under pressure from a source not shown is applied to an inlet port 214 in cylinder 150, and ports 216 and 218, when uncovered by pistons 208 and 212, allow fluid to escape from the cylinder.

Cylinder 150 is an element of the proportional and integral control device 110, the components of which are shown within the dash line box 110 of FIG. 3.

Two conduits 220 and 222 provided with individual control valves 224 lead from positions above and below the central piston 210 of cylinder 150 to points above and below the piston 226 of an actuating cylinder 151 which performs the integrating function of controller 110.

An hydraulic line 152 leads from the upper end of the cylinder 150, above the uppermost piston 208 thereof, to the upper end of a cylinder 153 constituting the proportionally operating portion of the controller 110. Pistons 226 in cylinder 151 and 228 in cylinder 153 are coupled by links 230 and 232 with a lever 154, pivoted at an intermediate point 234 to a link 236 moving in guides 238. Link 236, which moves in response to motion of the pistons 226 and 228, operates on a hydraulic cylinder 155 to transform the motion of link 236 into a hydraulic signal in channel 142. Channel 142 leads to an operating cylinder 119 whose piston is coupled to the movable element in the feed-water flow control valve 103. Cylinder 155, and cylinders 170, 172, 175 and 240 of FIG. 3 may be similar to cylinder 206.

In FIG. 3 float mechanism 111 of the water separator 106 is shown coupled to the valve 113 to open and close the same in accordance with the water level in the separator. Float 111 is also coupled to a cam 156 which imposes on its follower 157 a position representative of the instantaneous setting of valve 113. Cam 156 with its follower 157 and hydraulic cylinder 240 together constitute the proportionally operating control device 112 of FIG. 1.

Cylinder 240 transforms the positional intelligence of cam follower 157 into a hydraulic signal in line 145 which is operative on a servo-control cylinder 159 similar to the cylinder 150, except that in cylinder 159 ports 216 and 218 are connected to the source of hydraulic fluid under pressure whereas port 214 is an escape port. Servo-control cylinder 159 with its associated actuating cylinder 158 (similar to cylinder 151) and signal cylinder 170 (similar to cylinder 155) constitute the integrating apparatus 116 of FIG. 1.

Accordingly variations in hydraulic pressure in the line 145 are translated into hydraulic signals in line 147 from which they pass to the lower end of cylinder 150, below piston 212 therein, and also to the second cylinder 153 of device 110, below piston 228 therein.

Control cylinder 159 also receives at its end opposite to line 145 the hydraulic line 171 leading from the transformer 115 and more particularly from the cylinder 172 thereof. The pressure signals in line 171 are developed by cylinder 172 from motions imposed on cam follower 242 by cam 173, which is coupled by linkage 243 for rotation about a fixed point to the bellows of the pressure difference measuring device 114. Two lines 246 and 248 connect the opposite sides of the bellows in device 114 with the opposite sides of the pressure measuring perforated diaphragm 107' in chamber 107. The profile of cam 173 is made to conform to a particular function of the rates of water extraction which are to be maintained at various operating levels of the steam generating system.

Linkage 243 further leads to a second cam 174 whose follower 250 operates on the piston of a converter cylinder 175 to develop a hydraulic signal in line 149 serving as an advance bias signal to the actuating cylinder 119 of the feed-water control valve 103.

The operation of the system of FIG. 3 is as follows:

Upon an increase in temperature at the output end of evaporator 105, the pressure in line 141 increases, forcing down the pistons in cylinder 150. Hydraulic fluid under pressure accordingly flows in at port 214 and out through conduit 220 to the upper side of piston 226 in cylinder 151, forcing piston 226 downwards. This lowers the pressure above the piston in cylinder 155, lowering the pressure below the piston in cylinder 110. This causes valve 103 to open.

The increased pressure in line 141 is at the same time operative via line 152 on the upper side of piston 228 in cylinder 153 and forces that piston downwards also, effecting a further reduction in pressure in line 142 and a further opening of valve 103 by its effect on cylinder 119.

When the quantity of extracted water present in separator 106 increases, the opening of valve 113 is increased by motion of the float 111, drawing cam 156 to the right in FIG. 3. This increases the pressure in line 145, shifting the triple piston in cylinder 159 to the right in FIG. 3 and admitting hydraulic fluid under pressure through its port 218 and conduit 222 to the right side of the piston 252 in cylinder 158. Piston 252 is accordingly moved to the left, with consequent increase in pressure in line 147. This increased pressure in line 147 operates on the cylinders 150 and 153 as a reference level in the temperature control circuit previously described, which extends from the temperature measuring device 109 through the controller 110 and operating cylinder 119 to valve 103.

Shift in the position of the pistons in cylinder 150 continues until the pressures in lines 141 and 147 become equal. Similarly the pistons in cylinder 159 shift to an off-center position while the pressures in lines 145 and 171 are unequal, the pressure in line 171 serving as a reference to which the rate of water extraction controlled at valve 113 is compared. The pressure rises in line 171 with increasing rate of steam flow through line 140 producing a counterclockwise rotation of cam 173.

Similarly the pressure rises in line 149 as the rate of steam flow rises in line 140 and cam 174 rotates counterclockwise. The consequent hydraulic signal in line 149 operates directly on control cylinder 119 of the feed-water control valve 103.

While the invention has been described hereinabove in terms of a number of preferred embodiments, the invention itself is not limited thereto, numerous modifications on and departures from these embodiments being possible within the scope of the invention itself, which is intended to be set forth in the accompanying claims.

I claim:

1. In a once-through forced circulation boiler including a feed pump, a feed-water supply control valve, an evaporator, and a water separator, means to control the rate of supply of feed-water comprising means to develop a first signal representative of steam temperature in the evaporator, a valve controlling withdrawal of water from said separator, means to develop a second signal representative of the position of said last-named valve and indicative of the rate of water extraction through said last-named valve, means to develop a third signal representative of the rate of flow of steam out of said separator, means to develop from said second and third signals a fourth signal representative of the ratio of water extracted to steam delivered from said separator, and means to control the opening of said first-named valve in response to the difference between said first and fourth signals.

2. In a once-through forced circulation boiler including a feed pump, a feed-water supply control valve, an evaporator, and a water separator, means to control the rate of supply of feed-water comprising means to develop a first signal representative of steam temperature in the evaporator, a float-controlled valve controlling withdrawal of water from said separator, means to develop a second signal representative of the position of said last-named valve and indicative of the rate of water extraction through said last-named valve, means to develop a third signal representative of the rate of flow of steam out of said separator, means to develop from said second and third signals a fourth signal representative of the ratio of water extracted to steam delivered from said separator, and means to control the opening of said first-named valve in response to the difference between said first and fourth signals.

3. In a once-through forced circulation boiler including a feed pump, a feed-water supply control valve, an evaporator, and a water separator, means to control the rate of supply of feed-water comprising means to develop a first signal representative of steam temperature in the evaporator, a valve controlling withdrawal of water from said separator, means to develop a second signal representative of the position of said last-named valve and indicative of the rate of water extraction through said last-named valve, means to develop a third signal representative of the rate of flow of feed-water into said evaporator, means to develop from said second and third signals a fourth signal representative of the ratio of water extracted to feed-water delivered to said evaporator, and means to control the opening of said first-named valve in response to the difference between said first and fourth signals.

References Cited in the file of this patent

UNITED STATES PATENTS

| 1,975,086 | Dickey | Oct, 2, 1934 |
| 2,170,347 | Dickey | Aug. 22, 1939 |

FOREIGN PATENTS

| 558,981 | Belgium | Jan. 6, 1958 |

(Corresponding to British Patent No. 817,121, July 22, 1959)

OTHER REFERENCES

ASME Transactions, Volume 75, October 1953, European Practice with Sulzer Monotube Steam Generators, pages 1345–1347 applicable.